United States Patent [19]

Jacob-Grinschgl et al.

[11] Patent Number: 4,833,774
[45] Date of Patent: May 30, 1989

[54] METHOD OF MAKING A CURSOR FOR AN INDUCTIVE SENSOR

[75] Inventors: Wolfgang Jacob-Grinschgl, Munich; Udo Müller, Unterschleissheim, both of Fed. Rep. of Germany

[73] Assignee: Kontron Holding A.G., Zurich, Switzerland

[21] Appl. No.: 131,286

[22] Filed: Dec. 10, 1987

Related U.S. Application Data

[63] Continuation of Ser. No. 7,696, Jan. 28, 1987, abandoned, which is a continuation of Ser. No. 783,293, Oct. 2, 1985, abandoned.

[30] Foreign Application Priority Data

Oct. 5, 1984 [DE] Fed. Rep. of Germany ....... 3436642

[51] Int. Cl.⁴ ............................................. H01F 41/06
[52] U.S. Cl. ...................................... 29/605; 29/593; 178/19; 242/7.03
[58] Field of Search .................. 29/593, 602.1, 605, 29/606; 242/7.03; 178/18, 19, 20

[56] References Cited

U.S. PATENT DOCUMENTS

| | | | |
|---|---|---|---|
| 3,359,630 | 12/1967 | Metz | 242/7.03 X |
| 3,647,963 | 3/1972 | Bailey . | |
| 3,982,165 | 9/1976 | Rich | 318/568 |
| 4,061,966 | 12/1977 | Sedlacek et al. . | |
| 4,185,165 | 1/1980 | Fencl . | |
| 4,194,084 | 3/1980 | Hetzel . | |
| 4,206,314 | 6/1980 | Purgh et al. . | |
| 4,243,843 | 1/1981 | Rocheleau . | |
| 4,368,351 | 1/1983 | Zimmer . | |
| 4,368,352 | 1/1983 | Davis . | |
| 4,451,698 | 5/1984 | Whetstone et al. | 178/19 |
| 4,577,058 | 3/1986 | Collins . | |

FOREIGN PATENT DOCUMENTS 1475746 6/1977 United Kingdom .
2054300A 2/1981 United Kingdom .

Primary Examiner—Carl E. Hall
Attorney, Agent, or Firm—Jon S. Saxe; Bernard S. Leon; A. Kate Huffman

[57] ABSTRACT

A transparent disk with a round periphery is produced, for example, by a grinding operation, and a mark is placed at the geometric center of the disk. A coil is then wound about the periphery of the disk. As a consequence, the mark at the geometric center of the disk coincides with the electrical center point of the coil, thus obviating the need for a bobbin, or coil former, on which the coil can be wound.

The transparent disk is first ground into a round shape, and a metallic film is deposited on a surface of the disk. The film is coated with a photosensitive resist material, and then exposed through a mask to define an image of a mark at the geometric center of the disk. The film is then etched to remove all but the mark from the disk.

In manufacturing the coil, the disk, is concentrically clamped between two plates of a winding jig, each plate having annular peripheral flanges that are radially larger than the disk and thus project beyond the periphery of the disk. The flanges are spaced from each other to define a winding space around the periphery of the disk. A wire may then be wound on the periphery of the disk in the space between the flanges to form a coil. Thereafter, the turns of wire may be binded to themselves and to the periphery of the disk.

8 Claims, 1 Drawing Sheet

METHOD OF MAKING A CURSOR FOR AN INDUCTIVE SENSOR

This application is a continuation of Ser. No. 007,696 filed on Jan. 28, 1987, now abandoned, which in turn is a continuation application of Ser. No. 783,293 filed on Oct. 2, 1985, now abandoned.

TECHNICAL FIELD

THis invention relates to a cursor for an inductive sensor for use with a digitizer board, and to a method for making the cursor.

BACKGROUND ART

A digitizer board comprises a substrate carrying two groups of orthogonally disposed grid wires, each group comprising a plurality of spaced parallel conductors. A selectively operable control circuit causes equal current pulses to flow in predetermined sequence and direction through the conductors of one group of grid wires, and then through the other group, producing magnetic flux lines that are coupled to a coil in a measuring sensor when the latter is operatively positioned relative to the board. The resultant induced voltages in the coil are processed to provide the coordinate of the coil relative to the board.

One important application of digitizer boards of the type described is to obtain the coordinates of individual points defining a two dimensional profile on a sheet lying on the digitizer board. In such case, the coil is used as a cursor to permit an operator to visually select individual points on the profile whose coordinates are to be determined.

The spatial location of the point on the digitizer board whose coordinates are determined in the manner described above is coincident with the electrical center point of the coil. That is to say, the coordinates of a point determined with a toroid are the geometric center of the coil. Thus, when the coil is provided with cross-hairs aligned with the electrical center point of the coil to assist in visually positioning the coil, the degree to which the cross-hairs coincide with the electrical center point of the coil determines the coordinates produced by the processing of the voltages induced in the coil.

Conventionally, a glass plate carrying cross-hairs is adjustably mounted on the coil. After assembly of the glass plate and coil, the plate is adjusted with respect to the coil in an attempt to place the crossing point of the cross-hairs at the electrical center of the coil. While this may be achieved, the time and cost of this manufacturing operation is considerable. It is therefore an object of the present invention to provide a new and improved cursor which does not rely on any adjustment to accurately align the geometric center of the coil with its electrical center point, and to provide a new and improved method for manufacturing the cursor.

DISCLOSURE OF INVENTION

According to the present invention, a transparent disk with a round periphery is produced, for example, by a grinding operation, and a mark is placed at the geometric center of the disk. A coil is then wound about the periphery of the disk. As a consequence, the mark at the geometric center of the disk coincides with the electrical center point of the coil. Thus, the need for a bobbin, or coil former, on which the coil can be wound is obviated by the method of the present invention.

According to a specific variant of the invention, the transparent disk is first ground into a round shape, and a metallic film is deposited on a surface of the disk. The film is then etched to define a mark at the geometric center of the disk. One technique for positioning the mark involves coating the film with a photosensitive resist material, and then exposing this material through a mask to define an image of a mark at the geometric center of the disk. The film is then etched to remove all but the mark from the disk.

In manufacturing the coil, the disk is concentrically clamped between two plates of a winding jig, each plate having annular peripheral flanges that are radially larger that the disk and thus project beyond the periphery of the disk. The flanges are spaced from each other to define a winding space around the periphery of the disk. A wire may then be wound on the periphery of the disk in the space between the flanges to form a coil. Thereafter, the turns of wire may be bonded to themselves and to the periphery of the disk. On removal of the resultant device from the winding jig, the disk and coil are easily handled.

BRIEF DESCRIPTION OF DRAWINGS

An embodiment of the present invention is shown in the accompanying drawings wherein.

DETAILED DESCRIPTION

Figure 1:
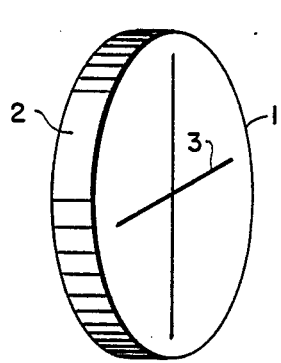
FIG. 1 is a perspective view of a round, transparent disk provided with cross-hairs.
Figure 2:
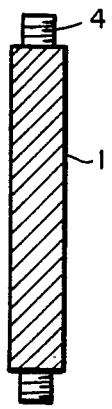
FIG. 2 is an axial section of a transparent disk with a coil mounted on the peripheral edges.

Referring now to FIG. 1, transparent disk 1, which may be of glass or plastic, has peripheral surface 2 that is ground into circular form. One end face of the disk is provided with cross-hairs 3, the crossing point being located at the geometric center of the disk.

The disk can be made by first grinding the edge of a glass plate, for example, to cylindrical form, and then depositing a metal film on the surface of the disk by a sputtering or other conventional process. A photosensitive resist coating is then applied to the metallic film, and is exposed to light through a photo-mask for defining the cross-hairs. For example, the mask may be a pot-shaped cover fitting exactly around the peripheral edge 2 of the disk and having slits in the form of a conventional cross. After exposure, the metal film is etched away in a conventional manner leaving only the cross-hairs on the surface of the disk.

Instead of using slits in a photo-mask to form the cross-hairs, a transparent cover having an opaque zone in the form of a cross-hair may be used, or an optical image of any required center point marking on the photosensitive layer can be utilized.

Figure 3:
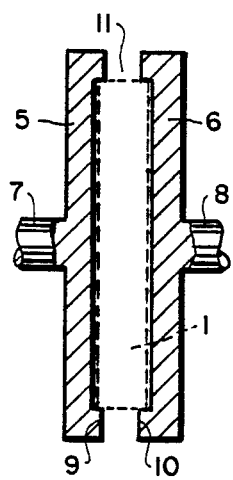
FIG. 3 is an axial section through a winding jig containing a transparent disk prior to the winding of a coil around the periphery of the disk.

After being treated in the manner described above, the disk is then clamped in a winding jig as shown in FIG. 3. The winding jig is formed by two plates 5 and 6, each mounted coaxially at the ends of respective shafts 7 and 8. Shafts 7, 8 project outwardly from plates 5 and 6, and are in coaxial alignment. The facing axial surfaces of plate 5 and 6 have annular shoulders 9, 10 at the periphery of the surfaces, the shoulders extending radially from the axis of shaft 7, 8 a distance beyond the periphery of disk 1 clamped between the end plates. As indicated in FIG. 3, the annular shoulders face each other but are spaced and define an axial gap which forms winding space 11 for the coil winding to be applied. Plates 5 and 6 have central depressions concentric with the axis of shafts 7 and 8 for snugly receiving a disk with practically no play.

Shafts 7 and 8 are mounted in bearings (not shown) so that the entire assembly of the plate and disk are rotatable about an axis defined by shafts 7 and 8. A wire is then wound on peripheral surface 2 of the disk as the winding jig rotates thus forming coil 4 which is shown in broken lines in FIG. 3. The peripheral edge 2 of the disk, and the spaced facing annular surfaces of shoulders 9 and 10 are the practical equivalent of a bobbin or coil former.

If enamelled stove wire is used for the winding, the coil can be fixed on the edge of the disk by heating the winding, for example, by briefly flowing a sufficient current through the winding. Alternatively, fixing of the winding can be effected by adhesive or other known techniques.

A cursor made in the manner described above has a marking at its geometric center that deviates from the electrical center point of the coil through a distance less than 0.1 mm.

We claim:

1. A method for making a cursor for an inductive sensor for use with a digitizer board that produces magnetic flux that is inductively coupled to a coil carried by the sensor, said method comprising:
   (a) producing a transparent disk with a round periphery; then
   (b) placing a mark on a major surface of the disk at its geometric center; then
   (c) clamping the disk between two plates, each plate having an axial surface facing an axial surface of the other plate, and each plate having an annular shoulder disposed on said axial surface of each of said plates, said annular shoulder extending beyond the periphery of the disk in a radial direction from an axis of the plate, said axial surfaces and said annular shoulders of said plates being spaced apart from each other to define an annular winding space between said annular shoulders and around the periphery of the disk; then
   (d) winding a wire about the periphery of the disk within said winding space to form said coil around the periphery of the disk thereby minimizing adjustment to align an electrical center of the coil with the mark.

2. A method according to claim 1 including the step of grinding the transparent disk to a circular shape to produce the round periphery.

3. A method according to claim 1 including the steps of:
   (a) depositing a film on a surface of the disk; and
   (b) removing portions of the film to define a mark at the geometric center of the disk.

4. A method according to claim 3 wherein the film is metallic and is etched to remove portions thereof.

5. A method according to claim 1 comprising the steps of:
   (a) depositing a metallic film on a surface of the disk;
   (b) coating the film with a photosensitive resist;
   (c) exposing the photosensitive resist through a mask to define an image of a mark at the geometric center of the disk;
   (d) etching the film to remove all but the mark at the geometric center of the disk.

6. A method according to claim 1 including the step of bonding the wound wire to itself.

7. A method according to claim 6 including the step of bonding the wound wire to the periphery of the disk.

8. A method according to claim 7 including the step of removing the disk together with the coil from between the two plates.

* * * * *